(12) United States Patent
Yamashita

(10) Patent No.: US 8,209,627 B2
(45) Date of Patent: Jun. 26, 2012

(54) METHOD OF CONTROLLING DISPLAY ON FUNCTION OPERATION SCREEN

(75) Inventor: Akiyoshi Yamashita, Ehime (JP)

(73) Assignee: Panasonic Corporation, Osaka (JP)

( * ) Notice: Subject to any disclaimer, the term of this patent is extended or adjusted under 35 U.S.C. 154(b) by 1108 days.

(21) Appl. No.: 12/090,193

(22) PCT Filed: Sep. 22, 2006

(86) PCT No.: PCT/JP2006/318837
§ 371 (c)(1),
(2), (4) Date: Apr. 14, 2008

(87) PCT Pub. No.: WO2007/046215
PCT Pub. Date: Apr. 26, 2007

(65) Prior Publication Data
US 2009/0138802 A1    May 28, 2009

(30) Foreign Application Priority Data
Oct. 17, 2005   (JP) ................... 2005-301090

(51) Int. Cl.
*G06F 3/048* (2006.01)

(52) U.S. Cl. ...................... 715/789; 715/810

(58) Field of Classification Search .......... 715/810, 715/789
See application file for complete search history.

(56) References Cited

U.S. PATENT DOCUMENTS

| | | | | |
|---|---|---|---|---|
| 6,266,060 B1* | 7/2001 | Roth | ........... | 715/853 |
| 6,583,797 B1* | 6/2003 | Roth | ........... | 715/810 |
| 6,934,917 B2* | 8/2005 | Lin | ........... | 715/811 |
| 7,237,240 B1* | 6/2007 | Chen et al. | ........... | 718/100 |
| 7,336,279 B1* | 2/2008 | Takiguchi | ........... | 345/473 |
| 2001/0002128 A1* | 5/2001 | Takayama et al. | ........... | 345/352 |
| 2006/0212829 A1* | 9/2006 | Yahiro et al. | ........... | 715/810 |
| 2007/0033275 A1* | 2/2007 | Toivonen et al. | ........... | 709/224 |
| 2007/0209018 A1* | 9/2007 | Lindemann | ........... | 715/784 |

FOREIGN PATENT DOCUMENTS

| | | |
|---|---|---|
| JP | 7-36656 | 2/1995 |
| JP | 9-292966 | 11/1997 |
| JP | 2003-76222 | 3/2003 |
| JP | 2003-244306 | 8/2003 |
| WO | WO 2007046215 A1 * | 4/2007 |

* cited by examiner

*Primary Examiner* — William Bashore
*Assistant Examiner* — Henry Orr
(74) *Attorney, Agent, or Firm* — Steptoe & Johnson LLP

(57) ABSTRACT

In an information utilizing device, a function item that has not been used by a user at all or that has a low frequency of use is deleted from function items displayed on a screen or is excluded from selectable items and displayed as a non-selectable item on the screen.

5 Claims, 8 Drawing Sheets

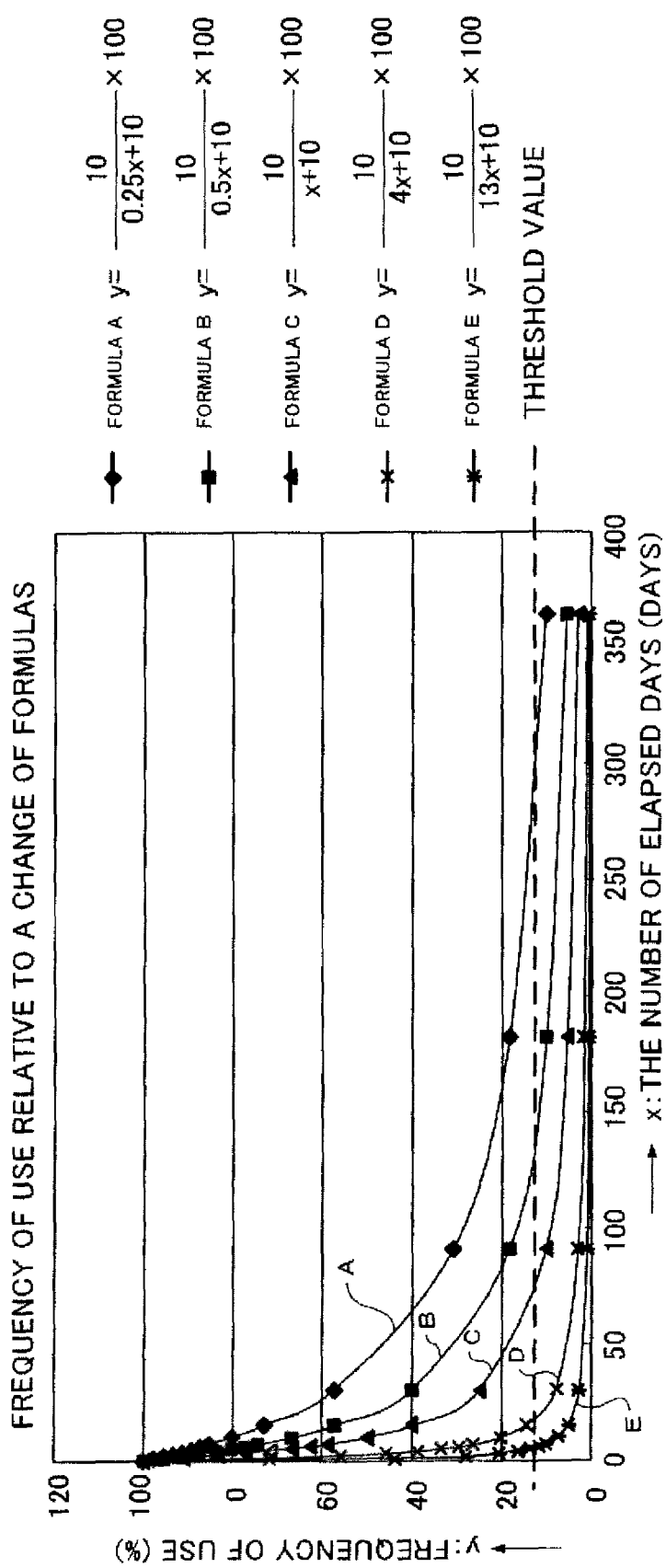

FIG. 6

| MAIN MENU | FUNCTION SELECTION | BASIC SETTING | ITEM SETTING | STORED DATA |
|---|---|---|---|---|
| [3] | [1] | [1] | [1] ON/OFF | The Number Of Elapsed Days/The Number Of Uses/Last Date Of Use |
| | | | [2] ON/OFF | The Number Of Elapsed Days/The Number Of Uses/Last Date Of Use |
| | | | [3] ON/OFF | The Number Of Elapsed Days/The Number Of Uses/Last Date Of Use |
| | | [2] | [1] ON/OFF | The Number Of Elapsed Days/The Number Of Uses/Last Date Of Use |
| | | | [2] ON/OFF | The Number Of Elapsed Days/The Number Of Uses/Last Date Of Use |
| | | | [3] ON/OFF | The Number Of Elapsed Days/The Number Of Uses/Last Date Of Use |
| | | [3] | [1] ON/OFF | The Number Of Elapsed Days/The Number Of Uses/Last Date Of Use |
| | | | [2] ON/OFF | The Number Of Elapsed Days/The Number Of Uses/Last Date Of Use |
| | | | [3] ON/OFF | The Number Of Elapsed Days/The Number Of Uses/Last Date Of Use |
| | | [4] | [1] ON/OFF | The Number Of Elapsed Days/The Number Of Uses/Last Date Of Use |
| | | | [2] ON/OFF | The Number Of Elapsed Days/The Number Of Uses/Last Date Of Use |
| | | | [3] ON/OFF | The Number Of Elapsed Days/The Number Of Uses/Last Date Of Use |
| | | [5] | [1] ON/OFF | The Number Of Elapsed Days/The Number Of Uses/Last Date Of Use |
| | | | [2] ON/OFF | The Number Of Elapsed Days/The Number Of Uses/Last Date Of Use |
| | | | [3] ON/OFF | The Number Of Elapsed Days/The Number Of Uses/Last Date Of Use |
| | [2] | [1] | [1] ON/OFF | The Number Of Elapsed Days/The Number Of Uses/Last Date Of Use |
| | | | [2] ON/OFF | The Number Of Elapsed Days/The Number Of Uses/Last Date Of Use |
| | | | [3] ON/OFF | The Number Of Elapsed Days/The Number Of Uses/Last Date Of Use |
| | | [2] | [1] ON/OFF | The Number Of Elapsed Days/The Number Of Uses/Last Date Of Use |
| | | | [2] ON/OFF | The Number Of Elapsed Days/The Number Of Uses/Last Date Of Use |
| | | | [3] ON/OFF | The Number Of Elapsed Days/The Number Of Uses/Last Date Of Use |
| | ... | ... | ... | ... |

S601

METHOD OF CONTROLLING DISPLAY ON FUNCTION OPERATION SCREEN

TECHNICAL FIELD

The present invention relates to, for example, a method of controlling display on a function operation screen for allowing a user to perform the multiple functions of an information utilizing device such as an information terminal, a computer peripheral device, and an information home appliance.

BACKGROUND ART

In recent years, an information terminal such as a mobile phone, a computer peripheral device such as a printer and a scanner, and an information home appliance such as a DVD recorder have been used as information utilizing devices having multiple functions, in various places not only on business but also at home. In order to allow users to perform the multiple functions of such information utilizing devices, techniques for controlling display on function operation screens have been widely available. In these techniques, display is controlled on a function operation screen such as a function selection screen to allow users to select necessary ones of a plurality of function items sequentially displayed on the screen.

The following will discuss a conventional method of controlling display on a function operation screen.

An information utilizing device such as a mobile phone and an information home appliance has various functions. Thus when the information utilizing device is operated to perform a desired function, a complicated operating procedure is necessary. For example, when writing an e-mail on a mobile phone, complicated key operations with many keystrokes are necessary in the writing of an address, a title, and a message.

To facilitate such complicated functions and key operations, special function keys are provided which memorize frequently used operations, so that the number of keystrokes is reduced. In another conventional technique (e.g., see Japanese Patent Laid-Open No. 2003-244306), a device is caused to learn and memorize complicated key operations. In still another conventional technique, frequently used operation screens are displayed more quickly.

DISCLOSURE OF THE INVENTION

In the conventional method of controlling display on a function operation screen, however, as the functionality of an information utilizing device is expanded, the number of complicated operations increases with an increase in the number of function items to be selected, so that the information utilizing device has a complicated function operation screen. Thus it is necessary for not only elderly people and children, who are generally unskilled in operating information utilizing devices, but also ordinary users to spend a long time to operate functions and thus mistakes easily occur in the operations. Further, even when function operations are allocated to function keys to simplify and facilitate the operations of the multiple functions, the number of allocations is disadvantageously limited.

The present invention is devised to solve the problem of the conventional art. An object of the present invention is to provide a method of controlling display on a function operation screen whereby the number of function items to be selected is reduced in an information utilizing device such that only the function items that are used somewhat frequently by a user and are necessary for the user are displayed on the screen, complication on the function operation screen is prevented to simplify and facilitate function operations for not only elderly people and children, who are generally unskilled in operating the information utilizing device, but also ordinary users, an operation time for the function operations can be shortened, and mistakes can be reduced in the operations.

In order to solve the problem, a method of controlling display on a function operation screen according to the present invention controls the display on the function operation screen for allowing a user to operate multiple functions in an information utilizing device having the multiple functions, the method including: storing the date of selection and use and the number of selections and uses of each of the functions in a corresponding storage area; and deleting, from the display or a selection screen on the information utilizing device, a function having not been selected or used for a predetermined number of elapsed days from the date of previous selection and use, the number of elapsed days being set beforehand for each of the functions based on the stored date and number of uses.

A method of controlling display on a function operation screen according to the present invention controls the display on the function operation screen for allowing a user to operate multiple functions in an information utilizing device having the multiple functions, the method including: storing the date of selection and use of each of the functions in a corresponding storage area; calculating the number of elapsed days from the date of previous selection and use to the date of current selection and use for each of the functions based on the stored date; calculating the frequency of use by using a predetermined formula based on the number of elapsed days of each of the functions; and deleting a function having a frequency of use of not larger than 10(%) from display or a selection screen on the information utilizing device.

Further, a method of controlling display on a function operation screen according to the present invention is the aforementioned method of controlling display on the function operation screen, wherein during the calculation of the frequency of use, the predetermined formula for calculating the frequency of use by using the number of elapsed days is a formula obtaining a frequency of use of not larger than 10(%) with the number of elapsed days set beforehand as a condition for deleting function display.

As described above, according to the present invention, a function item having not been used by a user at all or having a low frequency of use can be deleted from the function items displayed on the screen, or can be displayed as a non-selectable item on the screen.

Therefore, in the information utilizing device, the number of function items to be selected is reduced so as to display only the function items that are used somewhat frequently by a user and are necessary for the user, complication on the function operation screen is prevented to simplify and facilitate function operations for not only elderly people and children, who are generally unskilled in operating the information utilizing device, but also ordinary users, an operation time for the function operations can be shortened, and mistakes can be reduced in the operations.

BRIEF DESCRIPTION OF THE DRAWINGS

FIG. 4B is an explanatory drawing showing a graph of the function item deletion criterion in the method of controlling display on a function operation screen according to the embodiment;

FIG. 6 is an explanatory drawing of a storage status of corresponding information data after the function items are selected in the method of controlling display on a function operation screen according to the embodiment;

BEST MODE FOR CARRYING OUT THE INVENTION

Figure 1:
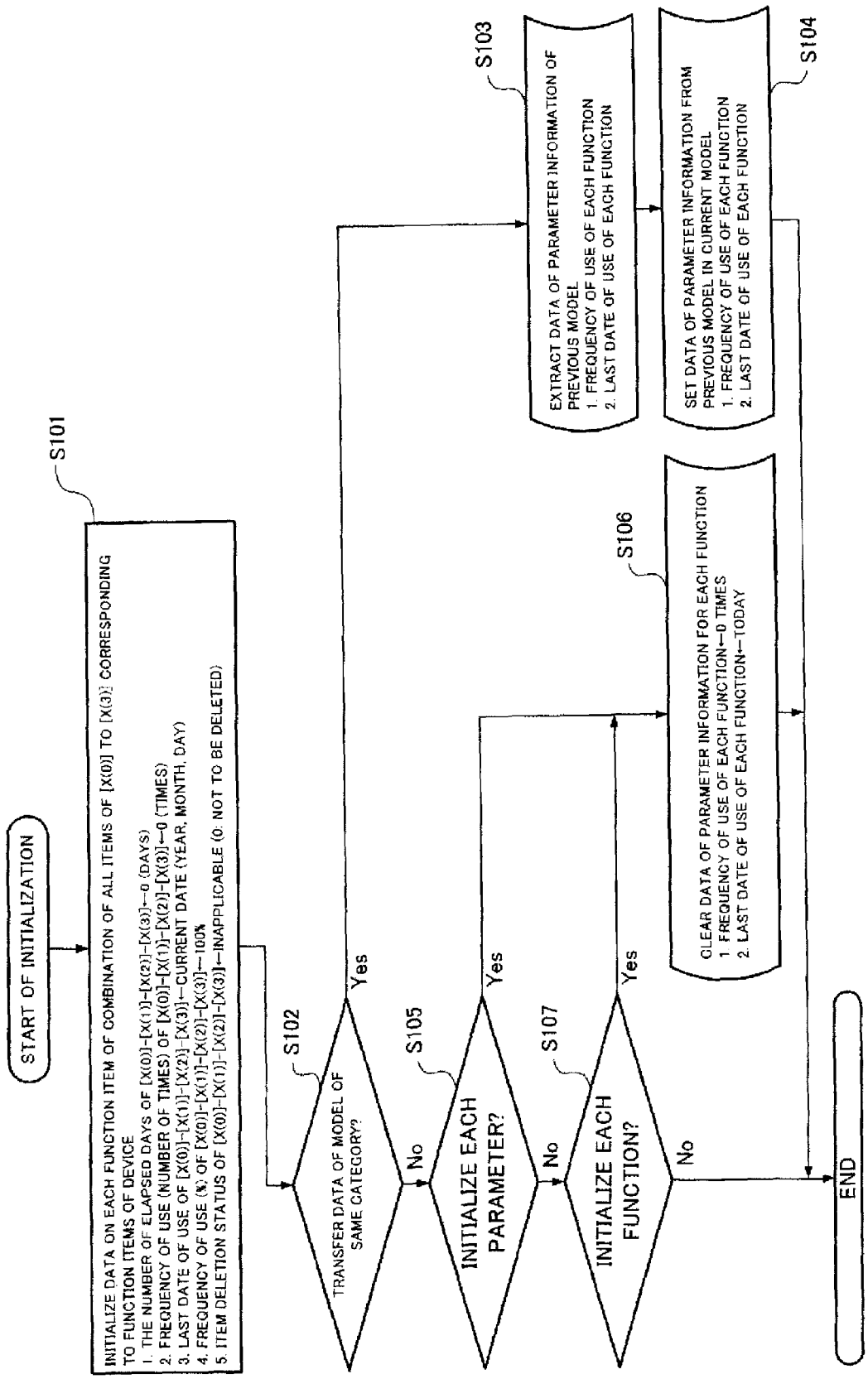
FIG. 1 is a flowchart showing the initialization of an information utilizing device in a method of controlling display on a function operation screen according to an embodiment of the present embodiment.

A method of controlling display on a function operation screen according to an embodiment of the present invention will now be specifically described with reference to the accompanying drawings.

The method of controlling display on a function operation screen according to the embodiment of the present invention is basically implemented as follows:

A method of controlling display on a function operation screen according to a first invention controls the display on the function operation screen for allowing a user to perform the multiple functions of an information utilizing device having the multiple functions, the information utilizing device including, for example, an information terminal such as a mobile phone, a computer peripheral device such as a printer and a scanner, and an information home appliance such as a DVD recorder, the method including: storing the date (year, month, date) of selection and use and the number of selections and uses of each of the functions in a corresponding storage area; and deleting, from the display or a selection screen on the information utilizing device, a function having not been selected or used for a predetermined number of elapsed days from the date of previous selection and use, the number of elapsed days being set beforehand for each of the functions based on the stored date and number of uses.

A method of controlling display on a function operation screen according to a second invention controls the display on the function operation screen for allowing a user to perform the multiple functions of an information utilizing device having the multiple functions, the information utilizing device including, for example, an information terminal such as a mobile phone, a computer peripheral device such as a printer and a scanner, and an information home appliance such as a DVD recorder, the method including: storing the date (year, month, day) of selection and use of each of the functions in a corresponding storage area; calculating the number of elapsed days from the date of previous selection and use to the date of current selection and use based on the stored date; calculating the frequency of use by using a predetermined formula based on the number of elapsed days of each of the functions; and deleting a function having a frequency of use of not larger than 10(%) from one of the display and a selection screen on the information utilizing device.

A method of controlling display on a function operation screen according to a third invention, wherein during the calculation of the frequency of use in the method of controlling display on a function operation screen according to the second invention, the predetermined formula for calculating the frequency of use by using the number of elapsed days is a formula (will be described later) obtaining a frequency of use of not larger than 10(%) with the number of elapsed days set beforehand, e.g., delimited periods such as a week, a month, three months, a half year, and a year as a condition for deleting function display.

A method of controlling display on a function operation screen according to a fourth invention, further including: moving the remaining items on the information utilizing device to an empty space generated, as a result of the processing of the method of controlling display on a function operation screen according to any one of the first to the third inventions, on one of the display and a selection item area on the information utilizing device according to the deletion of the function items from one of the display and the selection screen, and reducing a display area for the display/selection screen of each of the functions.

A method of controlling display on a function operation screen according to a fifth invention, further including: displaying the remaining items on the information utilizing device with larger characters in an empty space generated, as a result of the processing of the method of controlling display on a function operation screen according to any one of the first to the third inventions, on one of the display and a selection item area on the information utilizing device according to the deletion of the function items from one of the display and the selection screen.

In the method of controlling display on a function operation screen according to the embodiment of the present invention, the information utilizing device basically operates as follows:

(1) As a frequency of use of a function used by a user, the number of selections and uses by user operation is counted for each function and is stored for each function.

(2) The last dates of use are all stored for each function.

(3) The frequency of use (the number of operations) is examined at, e.g., three months, six month, one year, and so on in comparison with the current date, and a function item is automatically deleted from selection screen display when the frequency of use (%) calculated based on the number of operations is a certain value (threshold value) or less.

(4) Since function display is sequentially deleted on an information terminal and the like, a display area has an empty space in which larger characters are displayed, an explanation such as a help facility (operation assistance) is displayed, and functions having not been simultaneously displayed in the conventional art are additionally displayed.

A specific example of the method of controlling display on a function operation screen according to the embodiment of the present invention will now be described in accordance with the accompanying drawings.

First is the initialization of the information utilizing device in the method of controlling display on a function operation screen according to the embodiment of the present invention.

FIG. 1 is a flowchart showing the initialization of the information utilizing device in the method of controlling display on a function operation screen according to the present embodiment. In the method of controlling display on a function operation screen of the present embodiment, for example, first to fourth screens are switched as function selection screens. Regarding the function items of the information utilizing device, the item number of the function item selected on the first screen of the function selection screens is stored in a register denoted as X(0), the item number of the function item selected on the second screen of the function selection screens is stored in a register denoted as X(1), the item number of the function item selected on the third screen of the function selection screens is stored in a register denoted as X(2), and the item number of the function item selected on the fourth screen of the function selection screens is stored in a register denoted as X(3).

As shown in FIG. 1, when the initialization of the information utilizing device is started, first, for information data on each function item (data of an information storage table in a storage area shown in FIG. 6) of a combination of all the items of [X(0)] to [X(3)] (represented as [X(0)]-[X(1)]-[X(2)]-[X(3)]) that correspond to the function items of the information utilizing device, the following is set:

"0 (days)" as the number of elapsed days of [X(0)]-[(1)]-[X(2)]-[X(3)];

"0 (times)" as the frequency of use (number of times) of [X(0)]-[X(1)]-[X(2)]-[X(3)];

"current date (year, month, day)" as the last date of use of [X(0)]-[X(1)]-[X(2)]-[X(3)];

"100(%)" as the frequency of use (%) of [X(0)]-[X(1)]-[X(2)]-[X(3)]; and

"Inapplicable (0: not to be deleted)" as the item deletion status of [X(0)]-[X(1)]-[X(2)]-[X(3)].

The information utilizing device is initialized thus (step S101).

Next, when transferring the data of the information storage table between models of the same category (step S102), as information data transfer from the information utilizing device which is a model of the same category, the frequency of use of each function and the last date of use of each function are extracted from data of parameter information on the previous model (previously used model) (step S103), and the frequency of use of each function and the last date of use of each function as data of parameter information from the previous model are set in the current model (subsequently used model) (step S104). The initialization is completed thus. Further, in the subsequently used information utilizing device of the current model of the same category, through the initialization, the data of the information storage table is initialized to data at the start of use.

When data is not transferred between models of the same category (step S102) and the data of each piece of parameter information is initialized (step S105), as the initialization of the status of the information utilizing device at the start of use, the frequency of use of each function is set to "0 (times)" in the data of parameter information on each function, and the last date of use of each function is set to "today" and cleared (step S106). The initialization is completed thus.

Also when the data of each piece of parameter information is not initialized (step S105) and each function is initialized (step S107), as the initialization of the status of the information utilizing device at the start of use, the frequency of use of each function is set to "0 (times)" in the data of parameter information on each function, and the last date of use of each function is set to "today" and cleared (step S106). The initialization is completed thus. When each function is not initialized (step S107), the initialization is completed without any processing.

The following will discuss the setting of function item data during the daily operations of the information utilizing device in the method of controlling display on a function operation screen according to the embodiment of the present invention.

Figure 2:
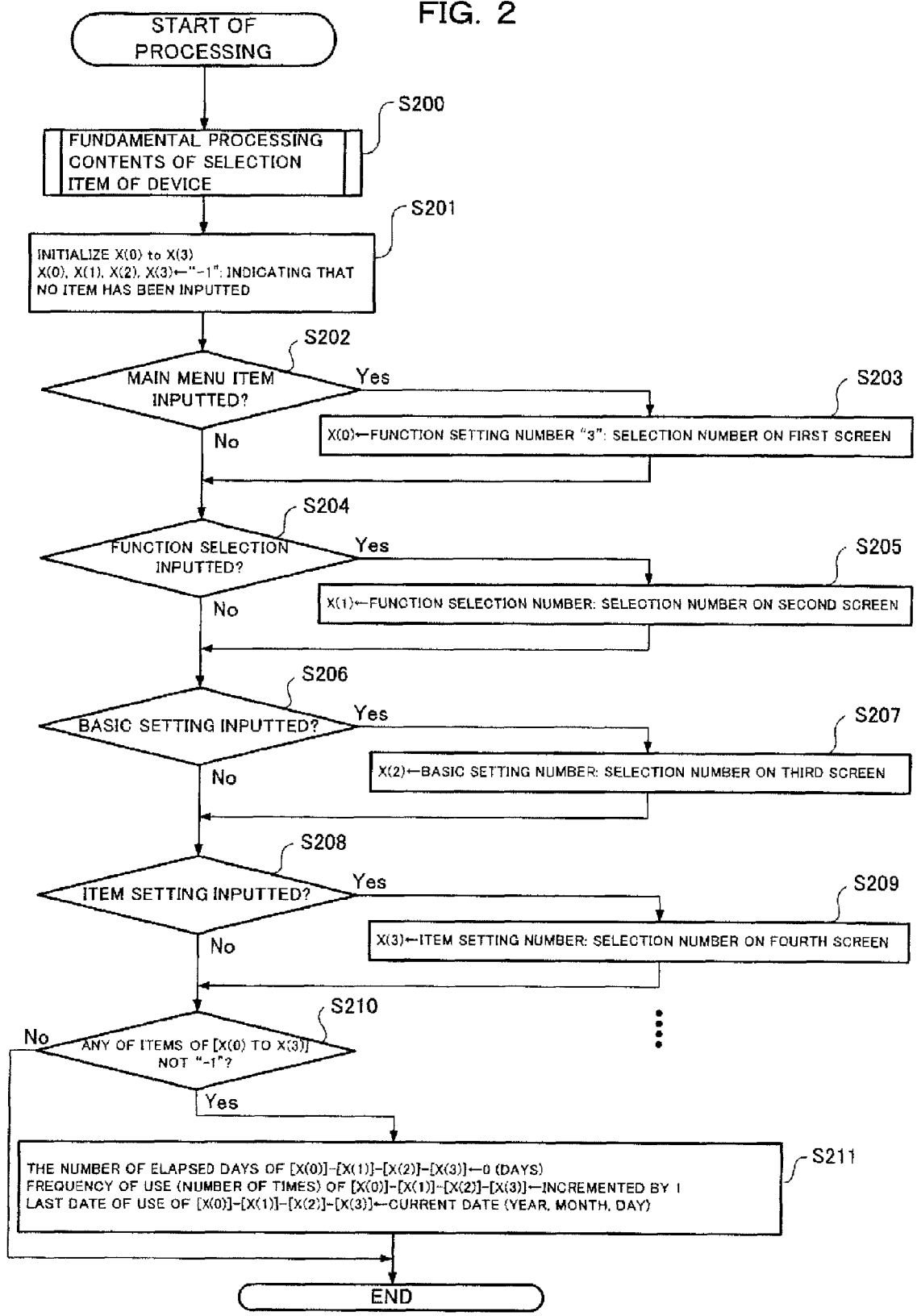
FIG. 2 is a flowchart showing the setting of function item data during the daily operations of the information utilizing device in the method of controlling display on a function operation screen according to the embodiment.
Figure 7A:
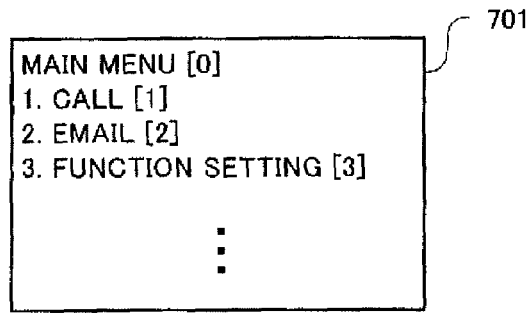
FIG. 7A is an explanatory drawing of a display example of a first screen of function selection screens in the method of controlling display on a function operation screen according to the embodiment.
Figure 7B:
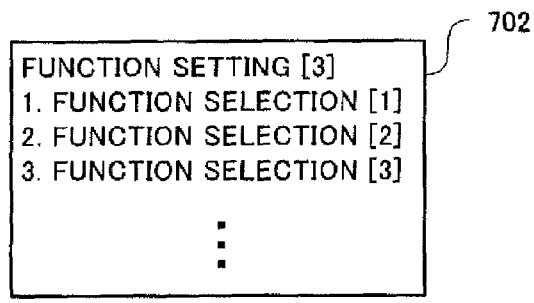
FIG. 7B is an explanatory drawing of a display example of a second screen of the function selection screens in the method of controlling display on a function operation screen according to the embodiment.
Figure 7C:
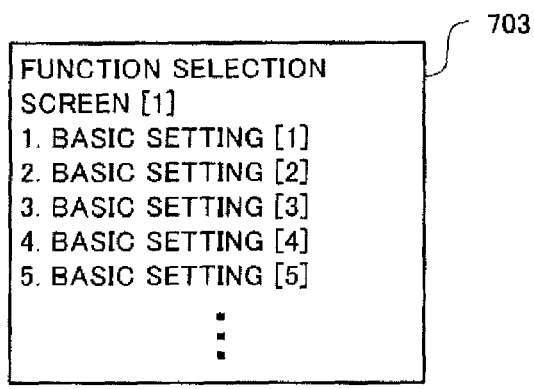
FIG. 7C is an explanatory drawing of a display example of a third screen of the function selection screens in the method of controlling display on a function operation screen according to the embodiment.
Figure 7D:
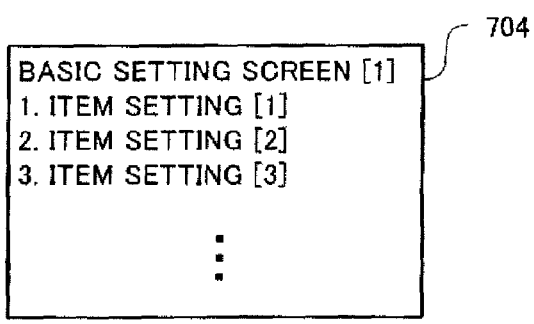
FIG. 7D is an explanatory drawing of a display example of a fourth screen of the function selection screens in the method of controlling display on a function operation screen according to the embodiment.

FIG. 2 is a flowchart showing the setting of function item data during the daily operations of the information utilizing device in the method of controlling display on a function operation screen according to the present embodiment. FIG. 7A is an explanatory drawing showing a display example of the first screen of the function selection screens in the method of controlling display on a function operation screen according to the present embodiment. FIG. 7B is an explanatory drawing showing a display example of the second screen of the function selection screens in the method of controlling display on a function operation screen according to the present embodiment. FIG. 7C is an explanatory drawing showing a display example of the third screen of the function selection screens in the method of controlling display on a function operation screen according to the present embodiment. FIG. 7D is an explanatory drawing showing a display example of the fourth screen of the function selection screens in the method of controlling display on a function operation screen according to the present embodiment.

As shown in FIG. 2, in the method of controlling display on a function operation screen according to the present embodiment, at the start of setting, regarding the selected function items of the information utilizing device, function operation items are selected as fundamental processing on first to fourth screens 701 to 704 of the function selection screens shown in FIGS. 7A to 7D. In this case, corresponding selection flags are first set (step S200). In this method, as shown in FIG. 7A, when "1" is selected on the first screen 701, processing corresponding to calling function is performed. When "2" is selected, processing corresponding to e-mail function is performed.

Further, as the initialization of [X(0) to X(3)], "−1" (indicating that no item has been selected) is set in the registers of [X(0), X(1), X(2), X(3)] (step S201).

Next, when one of the function items is selected and inputted on the main menu of the first screen 701 of FIG. 7A (step S202), a function setting number (in this case, "3") is set in X(0) as the selection number of an item selected on a selection screen displayed on the first screen 701 of FIG. 7A (step S203), and the process advances to step S204 as in the case where any one of the function items is not selected or inputted on the main menu (step S202).

Then, when one of the functions is selected and inputted on the second screen 702 of FIG. 7B (step S204), "function selection number" is set in X(1) as the selection number of an item selected on a selection is screen displayed on the second screen 702 of FIG. 7B (step S205), and the process advances to step S206 as in the case where any one of the functions is not selected or inputted on the second screen 702 (step S204).

Next, when one of the basic settings is selected and inputted on the third screen 703 of FIG. 7C (step S206), "basic setting number" is set in X(2) as the selection number of an item selected on a selection screen displayed on the third screen 703 of FIG. 7C (step S207), and the process advances to step S208 as in the case where any one of the basic settings is not selected or inputted on the third screen 703 (step S206).

Then, when one of the item settings is selected and inputted on the fourth screen 704 of FIG. 7D (step S208), "item setting number" is set in X(3) as the selection number of an item selected on a selection screen displayed on the fourth screen 704 of FIG. 7D (step S209), and the process advances to step S210 as in the case where any one of the item settings is not selected or inputted on the fourth screen 704 (step S208).

After the processing is performed, in the case where any of the items of "X(0) to X(3)" are not "−1" and have been selected and inputted (step S210), data stored in the information storage table in the storage area shown in FIG. 6 is set according to the function items selected in steps S203, S205, S207 and S209 as follows:

"0 (days)" is set as the number of elapsed days of [X(0)]-[X(1)]-[X(2)]-[X(3)];

the frequency of use (number of times) of [X(0)]-[X(1)]-[X(2)]-[X(3)] is incremented by 1; and "current date (year, month, day)" is set as the last date of use of [X(0)]-[X(1)]-[X(2)]-[X(3)] (step S211).

After this processing, the setting is completed as in the case where any one of "X(0) to X(3)" is "−1" and all the items of "X(0) to X(3)" have not been selected or inputted (step S210).

When additional selection screens are provided subsequently to the fourth screen, selection numbers on the screens are additionally recorded in registers according to an increase in the number of selection screens, as in the processing of steps S202 to S209.

The following will discuss the calculation of the number of uses and the frequency of use of each function item in the method of controlling display on a function operation screen according to the embodiment of the present invention. The calculation is daily performed as routine processing.

Figure 3:
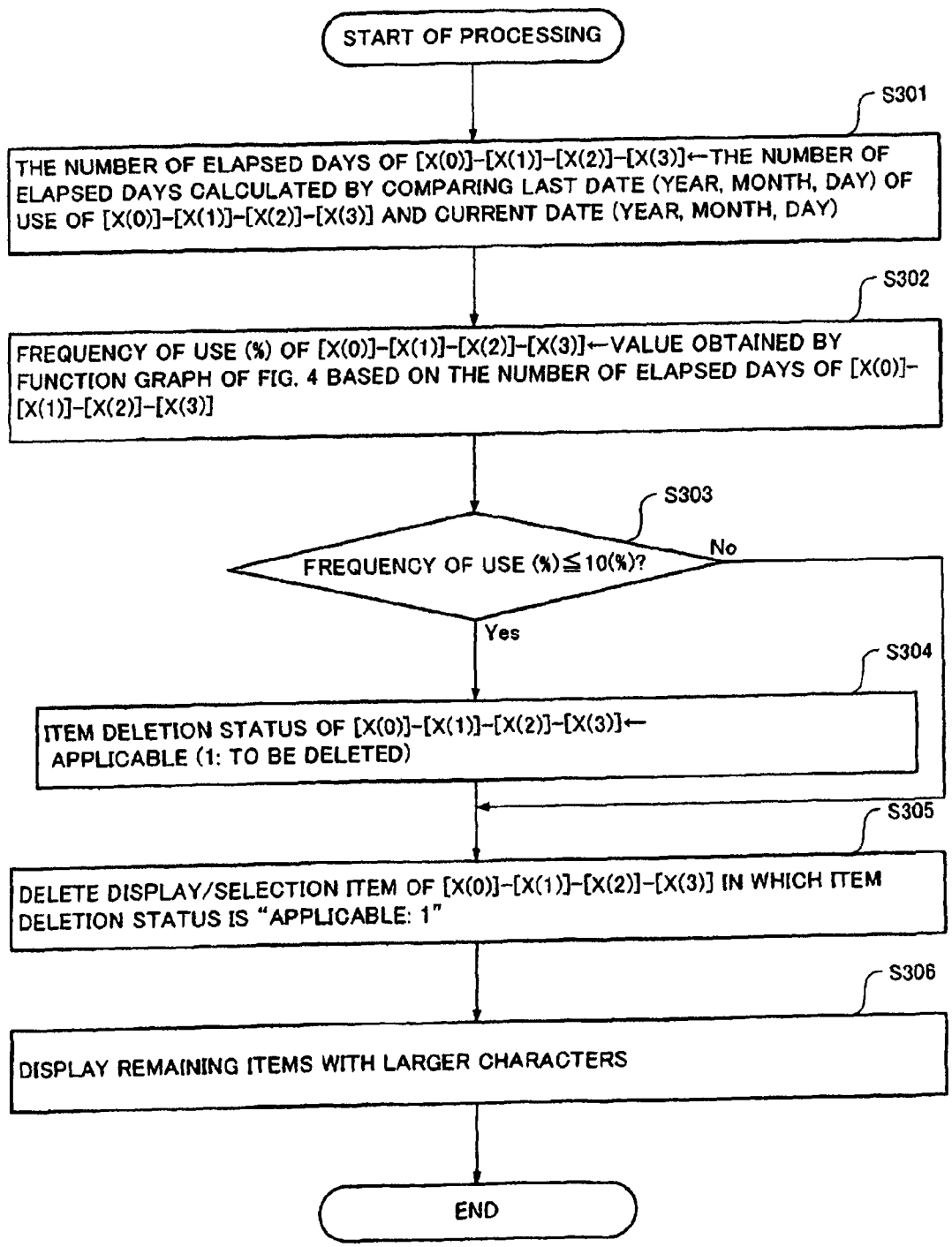
FIG. 3 is a flowchart showing the calculation of the number of uses and the frequency of use of each function item in the method of controlling display on a function operation screen according to the embodiment, the calculation being daily performed as routine processing.

FIG. 3 is a flowchart showing the calculation of the number of uses and the frequency of use of the function items in the method of controlling display on a function operation screen according to the embodiments of the present invention. The calculation is daily performed as routine processing. As shown in FIG. 3, in the method of controlling display on a function operation screen according to the present embodiment, at the start of the processing, the number of elapsed days calculated by comparing the last date of use (year, month, day) of [X(0)]-[X(1)]-[X(2)]-[X(3)] and current date (year, month, day) is first set as the number of elapsed days (days) of [X(0)]-[X(1)]-[X(2)]-[X(3)] which correspond to the function items having been selected according to the flowchart of FIG. 2 (step S301).

Next, a frequency of use (%) obtained based on the number of elapsed days of [X(0)]-[X(1)]-[X(2)]-[X(3)] by the function graph of FIG. 43 is set as the frequency of use (%) of [X(0)]-[X(1)]-[X(2)]-[X(3)] (step S302).

Then, when the frequency of use (%) is not larger than 10(%) (step S303), the item deletion status of [X(0)]-[X(1)]-[X(2)]-[X(3)] is set to "applicable" (1: to be deleted) (step S304). Next, the displays or selection items of [X(0)]-[X(1)]-[X(2)]-[X(3)] with item deletion statuses of "applicable: 1" are deleted (step S305). Finally, remaining displays or selection items are displayed with larger characters (step S306), and then the processing is completed.

When the frequency of use (%) is still larger than 10(%) (step S303), the displays or selection items of [X(0)]-[X(1)]-[X(2)]-[X(3)] whose item deletion statuses are "applicable: 1" are deleted (step S305), and then the processing is completed. In this case, other than the relevant items, the displays or selection items of [X(0)]-[X(1)]-[X(2)]-[X(3)] whose item deletion statuses are "applicable: 1" are deleted.

The following will discuss a deletion criterion when the function items are deleted in the calculation of the number of uses and frequency of use of each function item in FIG. 3.

Figure 4A:
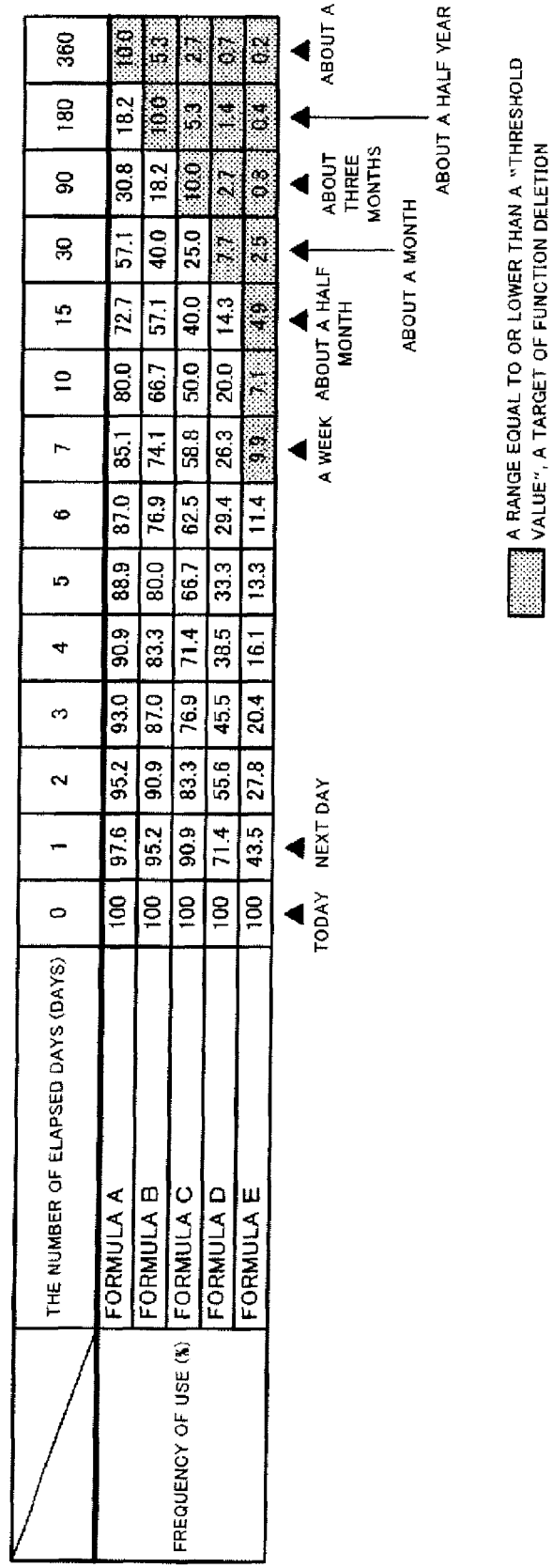
FIG. 4A is an explanatory drawing showing a table of a function item deletion criterion in the method of controlling display on a function operation screen according to the embodiment.

FIG. 4A is an explanatory drawing showing a table of the function item deletion criterion in the method of controlling display on a function operation screen according to the present embodiment. FIG. 4B is an explanatory drawing showing a graph of the function item deletion criteria in the method of controlling display on a function operation screen according to the present embodiment. In the method of controlling display on a function operation screen according to the present embodiment, as shown in FIG. 3, the value of the frequency of use is used as a function item deletion criterion in the calculation of the number of uses and frequency of use of each function item. A function item having a frequency of use of 10(%) or less is deleted from selection items. In FIG. 4B, for example, in the case where the number of elapsed days is 360 days (about one year) and a function item is deleted from the selection items when the frequency of use is not larger than 10(%), the frequency of use is calculated using formula A below:

Frequency of use (%)=100×10/(0.25×the number of elapsed days+10)

Similarly, in the case where the number of elapsed days is 180 days (about a half year) and a function item is deleted from the selection items when the frequency of use is not larger than 10(%), the frequency of use is calculated using formula B below:

Frequency of use (%)=100×10/(0.5×the number of elapsed days+10)

In the case where the number of elapsed days is 90 days (about three months) and a function item is deleted from the selection items when the frequency of use is not larger than 10(%), the frequency of use is calculated using formula C below:

Frequency of use (%) 100×10/(the number of elapsed days+10)

In the case where the number of elapsed days is 30 days (about one month) and a function item is deleted from the selection items when the frequency of use is not larger than 10(%), the frequency of use is calculated using formula D below:

Frequency of use (%)=100×10/(4×the number of elapsed days+10)

In the case where the number of elapsed days is seven days (about a week) and a function item is deleted from the selection items when the frequency of use is not larger than 10(%), the frequency of use is calculated using formula E below:

Frequency of use (%)=100×10/(13×the number of elapsed days+10)

In formulas A to E, the frequency of use (%) is calculated at a given number of elapsed days, for example, 0 to 360 days. The table of FIG. 4A shows the relationship among formulas A to E, the number of elapsed days (days), and the frequency of use (%).

According to this table, when the frequency of use (%) of each function item is calculated using, e.g., formula A relative to the number of elapsed days from the date of previous selection and use to the current selection, it is found that the frequency of use (%) is 10(%) or less when the number of elapsed days is 360 (about one year) or more. Thus it is understood that when the number of elapsed days is 360 (about one year) or more and a function item is to be deleted from the selection items on the screen by reducing the frequency of use (%) to 10(%) or less, formula A is preferably used to calculate the frequency of use.

In relation to the table of FIG. 4A, the graph of FIG. 4B has a horizontal axis corresponding to the number of elapsed days (days) and a vertical axis corresponding to the frequency of use (%). A dotted line indicates a threshold value. When the frequency of use is not larger than the threshold value, a function item is deleted from the selection items.

The following will discuss a selection hierarchical structure of the function items of the information utilizing device and a storage status of corresponding information data after the function items are selected, in the setting of function item data during the daily operations of the information utilizing device in FIG. 2.

Figure 5:
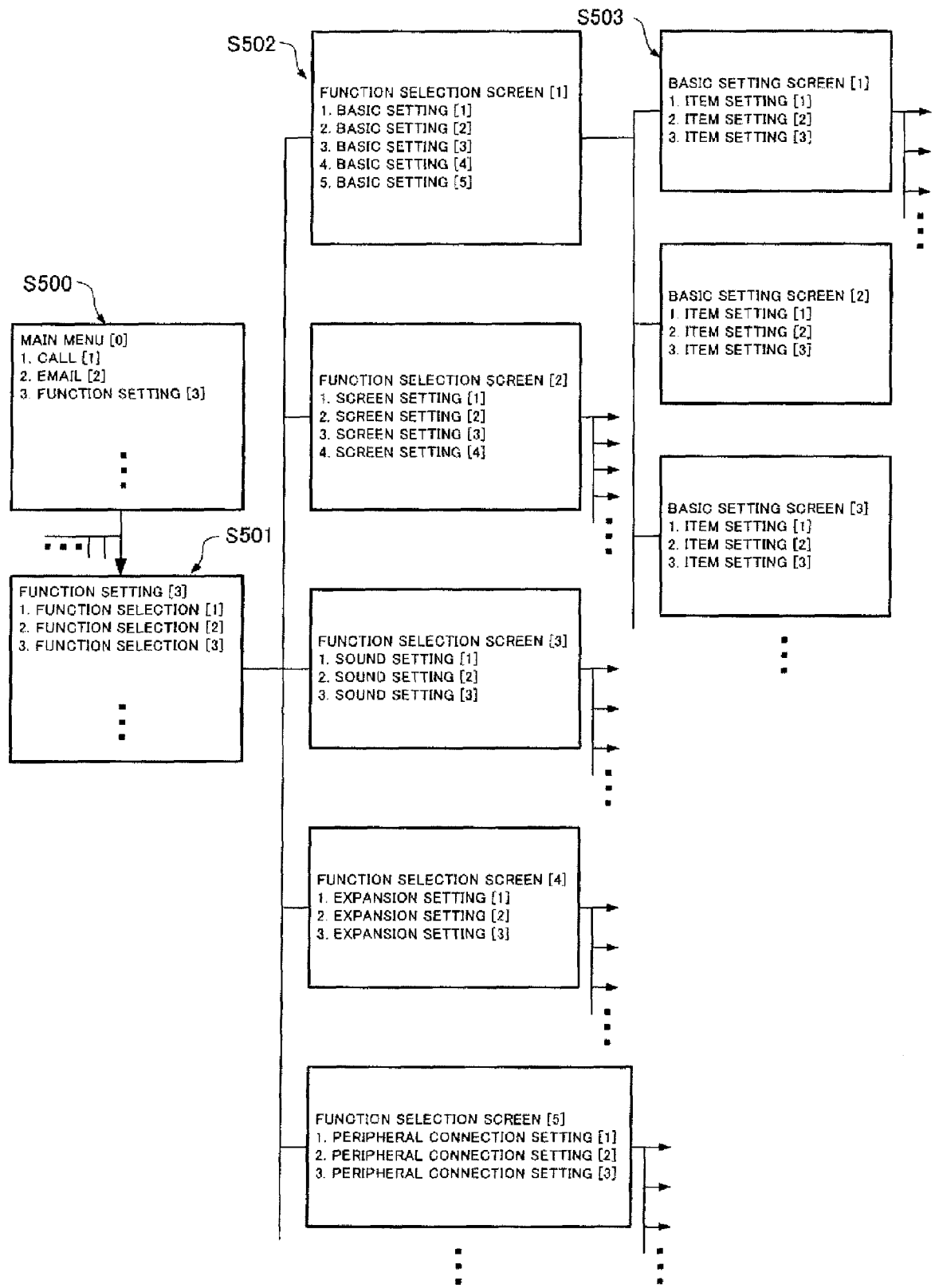
FIG. 5 is an explanatory drawing showing a hierarchical structure when the function items of the information utilizing device are selected in the method of controlling display on a function operation screen according to the embodiment.

FIG. 5 is an explanatory drawing showing the hierarchical structure when the function items of the information utilizing device are selected in the method of controlling display on a function operation screen according to the present embodiment. FIG. 6 is an explanatory drawing of the storage table indicating the storage status of corresponding information data in the storage area after the function items are selected in the method of controlling display on a function operation screen according to the present embodiment.

In the setting of function item data during the daily operations of the information utilizing device in FIG. 2, the function items of the information utilizing device are categorized, as shown in FIG. 5, into a main menu level 500, a function setting level 501, a function selection screen level 502, a basic setting screen level 503, and so on in a hierarchical structure. After the function items are selected, the stored data of the corresponding information in this hierarchical structure includes:
(1) The number of elapsed days of each function item (days)
(2) The frequency of use of each function item (times)
(3) The last date of use of each function item (year, month, day)
(4) The frequency of use of each function item (%)
(5) The item deletion status of each function item (0: not to be deleted, 1: to be deleted)

The stored data of the corresponding information is stored in the storage area as a storage table 601 indicating a storage state as shown in FIG. 6, together with selected function items on each level of the hierarchical structure of FIG. 5.

The storage table 601 of the information storing method has, for each selected function item, specific information formats below:
[3]-[1]-[1]-[1]: [the number of days] five days [the number of times] three times [date] Nov. 1, 2004
[3]-[1]-[1]-[2]: [the number of days] 60 days [the number of times] one time [date] Sep. 15, 2004
[3]-[1]-[1]-[3]: [the number of days] 180 days [the number of times] 0 times [date] Apr. 24, 2004

In the present embodiment, regarding formulas A to E for calculating the frequency of use (%) in FIGS. 4A and 4B, which formula should be used to calculate the frequency of use (%) is set beforehand for each kind of the information utilizing device.

In the aforementioned embodiment, a function item having a frequency of use of 10(%) or less is deleted from the selection items on the screen in the information utilizing device. The function item having a frequency of use of 10(%) or less may be displayed as a non-selectable item on the function selection screen with the function item display. When a user selects the non-selectable item, the user may be alerted that the function item selected by the user is a non-selectable item through, for example, one of error display on the screen and an audible alert or both of error display and an audible alert.

In the aforementioned embodiment, the criterion for deciding whether a function item should be deleted from the selection items on the screen or made non-selectable is a frequency of use of 10(%) or less in the information utilizing device. In this case, the value of the frequency of use is not limited to 10(%) or less and is set beforehand for each kind of the information utilizing device.

As described above, according to the present embodiment, a function item having not been used by a user at all or having a low frequency of use can be deleted from the function items displayed on the screen or can be displayed as a non-selectable item on the screen in the information utilizing device.

Consequently, in the information utilizing device, the number of function items to be selected is reduced so as to display only the function items that are used somewhat frequently by a user and are necessary for the user, complication on the function operation screen is prevented to simplify and facilitate function operations for not only elderly people and children, who are generally unskilled in operating the information utilizing device, but also ordinary users, an operation time for the function operations can be shortened, and mistakes can be reduced in the operations.

By initializing the information utilizing device in the method of controlling display on a function operation screen as described in FIG. 1, even when the information utilizing device is changed to a different model, function limitation information generated by automatic deletion of the function items on display can be continuously used in the subsequent model of the same category. Thus in the subsequent model of the same category, a user can more easily use the model from the initial state. In this way, the function operations can be easily continued in another model regardless of the model of the information utilizing device.

In the aforementioned embodiment, in the information utilizing device, a function item is deleted from the selection items on the screen based on the following criterion: the number of elapsed days is calculated based on the last date of use (year, month, day) and the current date of use (year, month, day), a frequency of use (%) which is calculated based on the number of elapsed days is compared with the threshold value to decide whether or not the value of the frequency of use is equal to or smaller than the threshold value, and the corresponding function item is deleted from the selection items on the display screen of the information utilizing device. A function item may be deleted from the selection items on the screen based on the following criterion: instead of comparing the frequency of use (%) which is calculated based on the number of elapsed days and the threshold value to decide whether or not the value of the frequency of use is equal to or lower than the threshold value, dates (year, month, day) of selection and use and the number of selections and uses are stored, for each function item, in the corresponding storage areas, a function item having not been selected or used in a period of a predetermined number of elapsed days is deleted from the selection items on the display screen of the information utilizing device based on the stored dates and number of uses. The predetermined number of elapsed days is set beforehand based on the date of previous selection and use.

Regarding the number of elapsed days from the date of previous selection and use, the value is set beforehand for each kind of the information utilizing device.

This method can also achieve the same effect as the aforementioned embodiment.

Further, in the information utilizing device of the aforementioned embodiment, the frequency of use (%) which is calculated based on the number of elapsed days from the date of previous use is compared with the threshold value to decide whether or not the value of the frequency of use is equal to or smaller than the threshold value, and the corresponding function item is deleted from the selection items on the display screen of the information utilizing device. Alternatively, a function item having not been selected or used in a period of a predetermined number of elapsed days is deleted from the selection items on the display screen of the information utilizing device. The predetermined number of elapsed days is set beforehand based on the date of previous selection and use. As a result of the processing, an empty space is generated on the display or a selection item area on the information utilizing device according to the deletion of the function items from the display or the selection screen. The remaining items on the information utilizing device are moved to the empty space, so that a display area for the display/selection screen of each of the functions can be reduced.

Moreover, in the information utilizing device of the aforementioned embodiment, the frequency of use (%) which is calculated based on the number of elapsed days from the date of previous use is compared with the threshold value to decide whether or not the value of the frequency of use is equal to or smaller than the threshold value, and the corresponding function item is deleted from the selection items on the display screen of the information utilizing device. Alternatively, a function item having not been selected or used in a period of a predetermined number of elapsed days is deleted from the selection items on the display screen of the information utilizing device. The predetermined number of elapsed days is set beforehand based on the date of previous selection and use. As a result of the processing, the function items on the display or the selection screen on the information utilizing device are reduced by the deletion of the function items such that an empty space is generated on the display or a selection item area. The remaining items on the information utilizing device can be displayed with larger characters in the empty space.

INDUSTRIAL APPLICABILITY

According to a method of controlling display on a function operation screen of the present invention, the number of function items to be selected is reduced in an information utilizing device so as to display only the function items that are used somewhat frequently by a user and are necessary for the user, complication on the function operation screen is prevented to simplify and facilitate the function operations for not only elderly people and children, who are generally unskilled in operating the information utilizing device, but also ordinary users, an operation time for the function operations can be shortened, and mistakes can be reduced in the operations. Thus the method of the present invention is applicable to information utilizing devices including an information terminal such as a mobile phone having multiple functions, a computer peripheral device such as a printer and a scanner, and an information home appliance such as a DVD recorder.

The invention claimed is:

1. A method of controlling display on a function operation screen for allowing a user to perform multiple functions in an information utilizing device having the multiple functions, the method comprising:
storing a date of selection and use of each of the functions in a corresponding storage area;
calculating a number of elapsed days from a date of previous selection and use to a date of current selection and use for each of the functions based on the stored date;
calculating a frequency of use by using a predetermined formula based on the number of elapsed days of each of the functions;
deleting a function having a frequency of use of not larger than 10% from one of the display and a selection screen on the information utilizing device; and
displaying remaining items on the information utilizing device with larger characters in an empty space generated, as a result of deletion on function display, on one of the display and a selection item area according to deletion of the function items from one of the display and the selection screen;
wherein during the calculation of the frequency of use, the predetermined formula for calculating the frequency of use by using the number of elapsed days is a formula obtaining a frequency of use of not larger than 10% with the number of elapsed days set beforehand as a condition for deleting function display;
and wherein when the number of elapsed days is between a half year and a year and the frequency of use is not larger than 10(%), the frequency of use is calculated using the formula below:

$$\text{Frequency of use (\%)} = 100 \times 10/(0.25 \times \text{the number of elapsed days} + 10).$$

2. A method of controlling display on a function operation screen for allowing a user to perform multiple functions in an information utilizing device having the multiple functions, the method comprising:
storing a date of selection and use of each of the functions in a corresponding storage area;
calculating a number of elapsed days from a date of previous selection and use to a date of current selection and use for each of the functions based on the stored date;
calculating a frequency of use by using a predetermined formula based on the number of elapsed days of each of the functions;
deleting a function having a frequency of use of not larger than 10% from one of the display and a selection screen on the information utilizing device; and
displaying remaining items on the information utilizing device with larger characters in an empty space generated, as a result of deletion on function display, on one of the display and a selection item area according to deletion of the function items from one of the display and the selection screen; wherein
during the calculation of the frequency of use, the predetermined formula for calculating the frequency of use by using the number of elapsed days is a formula obtaining a frequency of use of not larger than 10% with the number of elapsed days set beforehand as a condition for deleting function display;
and wherein when the number of elapsed days is between three months and a half year and the frequency of use is not larger than 10(%), the frequency of use is calculated using the formula below:

$$\text{Frequency of use (\%)} = 100 \times 10/(0.5 \times \text{the number of elapsed days} + 10).$$

3. A method of controlling display on a function operation screen for allowing a user to perform multiple functions in an information utilizing device having the multiple functions, the method comprising:
storing a date of selection and use of each of the functions in a corresponding storage area;
calculating a number of elapsed days from a date of previous selection and use to a date of current selection and use for each of the functions based on the stored date;

calculating a frequency of use by using a predetermined formula based on the number of elapsed days of each of the functions;

deleting a function having a frequency of use of not larger than 10% from one of the display and a selection screen on the information utilizing device; and displaying remaining items on the information utilizing device with larger characters in an empty space generated, as a result of deletion on function display, on one of the display and a selection item area according to deletion of the function items from one of the display and the selection screen;

wherein during the calculation of the frequency of use, the predetermined formula for calculating the frequency of use by using the number of elapsed days is a formula obtaining a frequency of use of not larger than 10% with the number of elapsed days set beforehand as a condition for deleting function display;

and wherein when the number of elapsed days is between three months and a half year and the frequency of use is not larger than 10(%), the frequency of use is calculated using the formula below:

Frequency of use (%)=100×10/(the number of elapsed days+10).

4. A method of controlling display on a function operation screen for allowing a user to perform multiple functions in an information utilizing device having the multiple functions, the method comprising:

storing a date of selection and use of each of the functions in a corresponding storage area;

calculating a number of elapsed days from a date of previous selection and use to a date of current selection and use for each of the functions based on the stored date;

calculating a frequency of use by using a predetermined formula based on the number of elapsed days of each of the functions;

deleting a function having a frequency of use of not larger than 10% from one of the display and a selection screen on the information utilizing device; and displaying remaining items on the information utilizing device with larger characters in an empty space generated, as a result of deletion on function display, on one of the display and a selection item area according to deletion of the function items from one of the display and the selection screen;

wherein during the calculation of the frequency of use, the predetermined formula for calculating the frequency of use by using the number of elapsed days is a formula obtaining a frequency of use of not larger than 10% with the number of elapsed days set beforehand as a condition for deleting function display;

and wherein when the number of elapsed days is between three months and a half year and the frequency of use is not larger than 10(%), the frequency of use is calculated using the formula below:

Frequency of use (%)=100×10/(4×the number of elapsed days+10).

5. A method of controlling display on a function operation screen for allowing a user to perform multiple functions in an information utilizing device having the multiple functions, the method comprising:

storing a date of selection and use of each of the functions in a corresponding storage area;

calculating a number of elapsed days from a date of previous selection and use to a date of current selection and use for each of the functions based on the stored date;

calculating a frequency of use by using a predetermined formula based on the number of elapsed days of each of the functions;

deleting a function having a frequency of use of not larger than 10% from one of the display and a selection screen on the information utilizing device; and displaying remaining items on the information utilizing device with larger characters in an empty space generated, as a result of deletion on function display, on one of the display and a selection item area according to deletion of the function items from one of the display and the selection screen;

wherein during the calculation of the frequency of use, the predetermined formula for calculating the frequency of use by using the number of elapsed days is a formula obtaining a frequency of use of not larger than 10% with the number of elapsed days set beforehand as a condition for deleting function display;

and wherein when the number of elapsed days is between three months and a half year and the frequency of use is not larger than 10(%), the frequency of use is calculated using the formula below:

Frequency of use (%)=100×10/(13×the number of elapsed days+10).

* * * * *